May 22, 1956     F. K. H. NALLINGER     2,746,433
INTERNAL COMBUSTION ENGINE OF INJECTION TYPE WITH
A COMBUSTION CHAMBER LATERALLY OFFSET
FROM THE CYLINDER SPACE
Filed Dec. 28, 1951     2 Sheets-Sheet 2
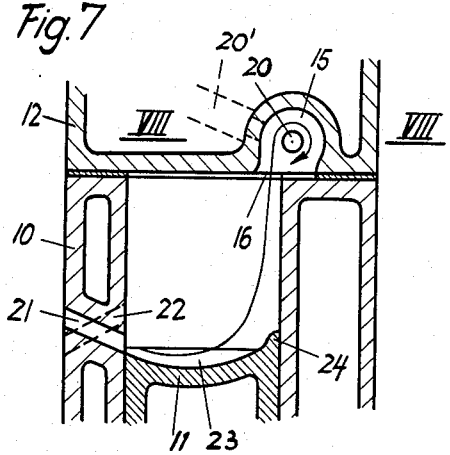
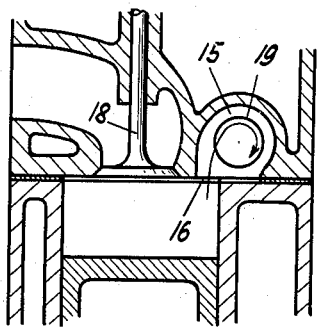
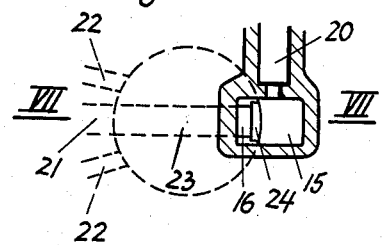
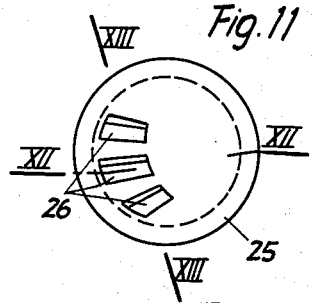
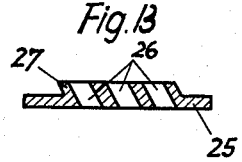
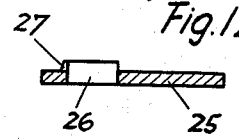
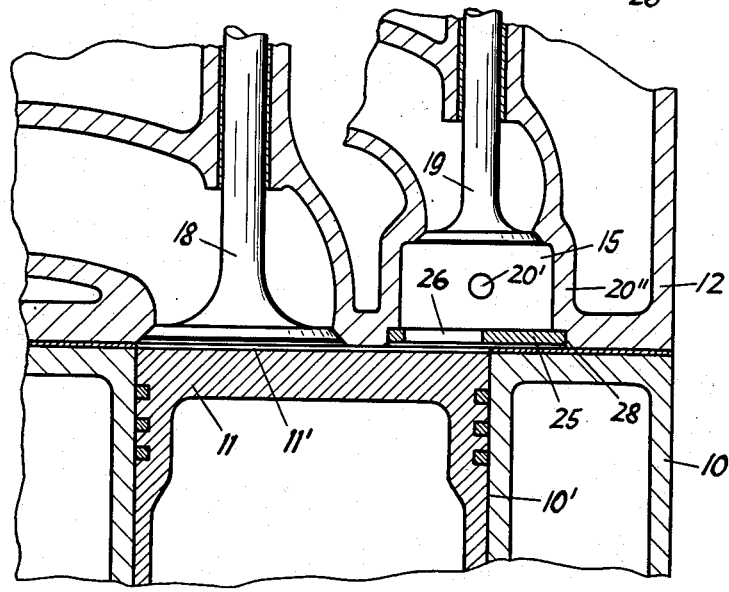

United States Patent Office 2,746,433
Patented May 22, 1956

2,746,433

INTERNAL COMBUSTION ENGINE OF INJECTION TYPE WITH A COMBUSTION CHAMBER LATERALLY OFFSET FROM THE CYLINDER SPACE

Friedrich K. H. Nallinger, Stuttgart, Germany, assignor to Daimler-Benz Aktiengesellschaft, Stuttgart-Unterturkheim, Germany Application December 28, 1951, Serial No. 263,815

Claims priority, application Germany June 14, 1951

6 Claims. (Cl. 123—32)

The present invention relates to an internal combustion engine of injection type with a combustion chamber arranged in the cylinder head, laterally offset from the cylinder space.

An object of the present invention is to provide an internal combustion engine which substantially combines the advantages of a precombustion chamber engine with the advantages of an engine having direct fuel injection.

Another object of the present invention is a simple design allowing simple engine castings.

Another object of the present invention is a valve-geared engine whose combustion chamber arrangement allows valves as large as possible, and thus warrants a high rate of air and fuel admission.

Another object of the present invention deals with an arrangement which produces an efficient turbulence of air and fuel.

Another object of the present invention is to provide such an arrangement of the elements causing a vortex motion in the combustion chamber as to make possible an unimpeded mounting and dismounting of the valves in this combustion chamber.

Another object of the present invention is to arrange the elements causing the vortex motion in the combustion chamber so as to be as resistant to thermic actions as possible and so as to facilitate exchange thereof if necessary.

Another object of the present invention is, moreover, to attain a high compression ratio in spite of using a combustion chamber offset from the cylinder space, to keep the heat-transferring surface of the combustion chamber relatively small, and to produce a relatively small throttling between the cylinder space and the combustion chamber serving as a main combustion chamber, in order to keep the thermic wastes or losses small, and to produce a high engine performance.

Another object of the present invention is, moreover, to provide an engine which is substantially unaffected by differences in fuels, by nozzles not injecting correctly, or by not being in strict adherence to the injection timing.

Further objects, features, and advantages of the present invention will become more obvious from the following description when taken in connection with the accompanying drawing which shows, for purposes of illustration only, several embodiments in accordance with the present invention, and wherein Fig. 1 is a vertical section in the axial direction along line I—I of Fig. 2 through an engine, e. g., a four-stroke-cycle engine with two valves arranged above the piston;

Fig. 7 is a vertical section in the axial direction along line VII—VII of Fig. 8 likewise through an engine having piston-controlled ports and a main combustion chamber the axis of which crosses the cylinder axis;

Fig. 8 is a horizontal section along line VIII—VIII of Fig. 7;

Fig. 9 is a vertical section through an engine similar to that illustrated in Fig. 7, however, of a four-stroke-cycle engine, e. g., and of valves disposed in the cylinder head.

Fig. 10 is a vertical section in the axial direction through the cylinder and the cylinder head of another embodiment of the invention;

Fig. 11 is a plan of the set-in partition;

Fig. 12 is a sectional view along line XII—XII of Fig. 11, and

Fig. 13 is a sectional view along line XIII—XIII of Fig. 12.

Figure 1:
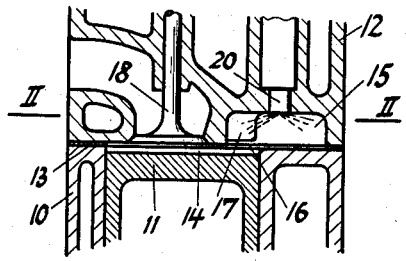

The cylinder head 12 is mounted with the separating line or the sealing or separating joint 13 on the cylinder block, in which piston 11 slides. The piston 11 closely approaches the cylinder head, or the sealing or separating joint in the piston top dead center position, so that only a narrow clearance 14 remains between the piston head and the cylinder head. The casting of the cylinder head is provided with a cylindrical core 15, beginning at the sealing or separating joint 13, and forming the main combustion chamber designed as a turbulence chamber and arranged so that, as seen in a plan view, it is located chiefly outside the cylinder periphery 10', yet intersected thereby so as to form a passage opening. At the bottom, the main combustion chamber is limited by the separating joint 13 between the cylinder block and its head.

In the forms of the construction according to the invention illustrated in Figs. 1-6, the cylindrical main combustion chamber 15 is so arranged that its axis runs parallel to the cylinder axis. In order to produce a rotary motion in the direction of the arrow (Fig. 2 or 4) of the air overflowing into the main combustion chamber 15 from the cylinder space by way of the passage opening 16 there are provided ribs 17, pointing tangentially to the cylindrical main combustion chamber 15. In this case the ribs may be integral with the cylinder head 12, but they may also be cast as individual parts or set in later on and consist of high-quality heat-proof material particularly for long lasting service. Furthermore, they may be arranged so that they are cooled particularly intensely from the outside by fluids, air etc.

Figure 2:
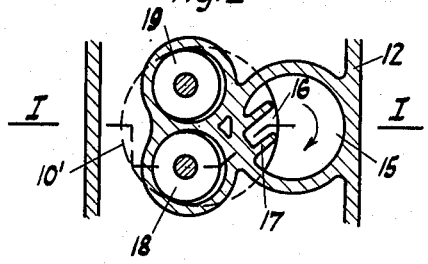
Fig. 2 is a horizontal section along line II—II of Fig. 1.

In the construction illustrated in Figs. 1 and 2 the engine operates with two valves 18 and 19 disposed side by side above the cylinder in the cylinder head outside the main combustion chamber. Furthermore, the piston may be provided with cores or recesses, or the valves may be recessed a little from the sealing joint 13 to avoid knocking against the piston head when the valves open. This can be also avoided by altering the valve timing. The fuel is injected through an injection nozzle 20 opening into the main combustion chamber, and disposed in the cylinder head in the axis of the cylindrical main combustion chamber.

During the compression stroke the air compressed in the cylinder space flows tangentially into the main combustion chamber 15 through the transfer port 16, and is deflected by the ribs 17, where it performs a vortex motion in the direction of the arrow, and thus distributes the fuel injected through the nozzle 20 into the air vortex uniformly through the main combustion chamber.

Figure 3:
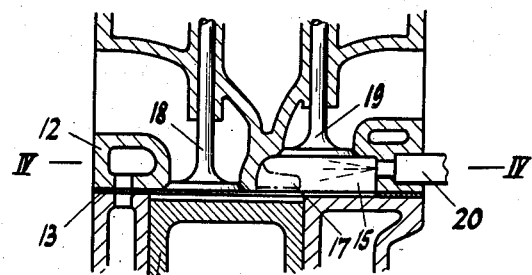
Fig. 3 is a vertical section in the axial direction along line III—III of Fig. 4 with one valve disposed above the piston and one above the main combustion chamber.
Figure 4:
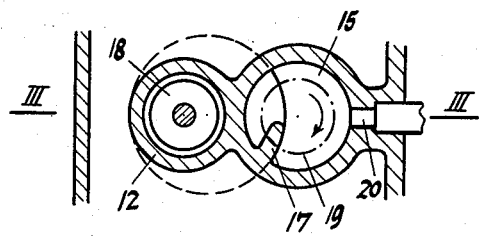
Fig. 4 is a horizontal section along line IV—IV of Fig. 3.

In the embodiment of the invention illustrated in Figs. 3 and 4 the one valve, e. g., the intake valve 18, is arranged above the piston head in the cylinder, the other valve, e. g., the exhaust valve 19, axially above the main combustion chamber 15.

In this case, by way of example, nozzle 20 is arranged so as to open horizontally into the main combustion chamber.

Figure 5:
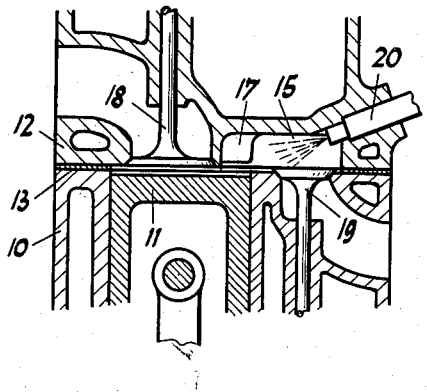
Fig. 5 is a vertical section in the axial direction through an engine having an overhead valve and a valve-on-the side.

In the embodiment illustrated in Fig. 5, the second valve 19 is arranged in the cylinder block in a vertical position. By way of example the injection nozzle 20 is arranged to open into the cylinder head slantingly with respect to the sealing groove or joint 13.

Also, with two or more valves, the one may be disposed in accordance with valve 19 in Fig. 3, and the other in accordance with valve 19 in Fig. 5.

Figure 6:
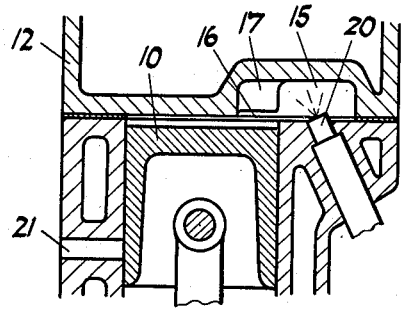
Fig. 6 is a vertical section in the axial direction through a two-stroke-cycle engine having piston-controlled ports.

Fig. 6 illustrates an embodiment of a two-stroke-cycle engine, in which the intake and the exhaust, or the intake or the exhaust are controlled by the piston by means of ports 21 in the cylinder. The cylinder head surrounds again the main combustion chamber 15, which is connected with the cylinder space by way of a transfer port 16 with ribs 17. In the embodiment of the invention illustrated in Fig. 6 the injection nozzle is set into the cylinder block so as to inject the fuel into the main combustion chamber 15 from the bottom. Of course, the nozzle 20, too, as in the case of the other embodiments might open into the main combustion from the top or from the side.

In the embodiment of the invention illustrated in Figs. 7–9, the main combustion chamber is arranged with a horizontal axis. It has a cylindrical shape and is tangentially connected with the cylinder space, by way of a transfer port 16, so as to cause a rotary motion of the overflowing air in the direction of the arrow, without using ribs or other devices.

Figs. 7 and 8 illustrate a two-stroke-cycle engine with ports 21 and 22 for controlling the intake and the exhaust on applying the reverse scavenging. The air entering through the ports 21 is directed in the piston head for instance through a groove 23, and deflected toward the transfer port 16 to the main combustion chamber 15, so that it will overflow directly into this chamber 15 and bring about a vortex motion there as shown in the direction of the arrow. In order to support this air stream and to maintain this vortex motion up to the piston top dead center positon, the piston 11 may also be provided with a lug 24 projecting into the transfer port 16. However, a piston with a flat heat may also be used. The injection valve may open into the main combustion chamber 15, operating as a turbulence chamber at 20 axially or also radially, as indicated, for example, at 20'.

Fig. 9 illustrates a construction provided for four-stroke- or two-stroke-cycle engines, in which the one valve 18 is disposed above the piston head outside the main combustion chamber and the other valve 19 in a horizontal position coaxially with the main combustion chamber 15. The injection valve, by way of example, may be disposed across from the valve 19, or also radially to the main combustion chamber. For the construction illustrated in Fig. 9, by the way, the same is true as for the other constructions.

Instead of running parallel or perpendicular to the cylinder axis, the axis of the cylindrical main combustion chamber may be at any angle; the axis of the main combustion chamber may intersect the cylinder axis or cross it some distance apart. The valves may also be disposed correspondingly. For good reasons, in all cases the exhaust member is provided for in the main combustion chamber, whereas the intake member, e. g., is arranged above the cylinder space. However, in some cases there may also be a reverse arrangement. In some cases the main combustion chamber may also be more or less different from the cylindrical shape.

In the embodiment of the invention illustrated in Figs. 10–13 the intake valve 18 and the exhaust valve 19 are again arranged parallel to each other and inverted; the exhaust valve is offset from the intake valve 18 and inside the cylindrical chamber 15 with a vertical axis forming the main combustion chamber and projecting about by half over the periphery of the cylinder. The chamber 15 in the cylinder head is separated from the cylinder block by a partition or plate 25. In this case the plate is fitted into a recess 28 of the cylinder head, so as to be kept in its position when mounting the cylinder head on the cylinder block. In some cases the plate 25 may also be connected with the cylinder head by screws or similar means so as to be removed again easily and to be simultaneously locked against rotation in its place. Plate 25 is provided with several slots 26 limited by rims 27 in the shape of a flange ring or blades directed upwardly. In this case the slots or openings 26 run, as particularly Fig. 13 illustrates, slantingly upwards, so as to deflect laterally the air overflowing from the cylinder space into chamber 15, thereby causing a vortex motion in chamber 15.

The interchangeability of plate 25 allows an unrestrained removal of valve 19 at any time and simultaneously such a small construction of chamber 15 as to warrant the required high compression ratio. The machining of the valve seat for the valve 19 can also be done unhampered, for example, by a milling cutter.

The injection valve may be arranged at any place, for instance in the side wall of chamber 15 at about 20' or 20''.

It will be noted also, that the valve opening into chamber 15 may also be used as the intake valve, and the opening into the cylinder space as exhaust valve.

What I claim is:

1. In an internal combustion engine comprising a cylinder block with a cylinder space, a cylinder head fastened to said block and closing said cylinder space, a piston reciprocating in said cylinder space, said piston closely approaching said cylinder head in the upper dead center position thereof, a combustion chamber in said cylinder head, said combustion chamber partially overlapping said cylinder space and partially lying outside thereof as seen in the plan view thereof, said combustion chamber being open in the direction of said cylinder block and providing a communicating opening between said cylinder space and the part of the combustion chamber overlapping the same, a valve in said combustion chamber coaxial therewith, another valve in said cylinder head outside said combustion chamber and above said cylinder space, one of said valves being an inlet valve and the other an outlet valve, said cylinder head being provided with a cut-out portion adjacent said cylinder block, a partition consisting of a substantially flat plate of larger cross section than the cross section of said combustion chamber inserted into said cut-out portion between said cylinder space and said combustion chamber and separating said combustion chamber from said cylinder block, said plate lying directly adjacent said cylinder head and being held in position solely by the fastening of the cylinder head to the cylinder block so as to be readily removable upon dismounting of the cylinder head from the cylinder block, and openings in said partition for imparting rotary motion to the air passing over from said cylinder space into said combustion chamber with said piston in the upper dead center position.

2. In an internal combustion engine comprising a cylinder block with a cylinder space, a cylinder head fastened to said cylinder block and closing said cylinder space, a piston reciprocating in said cylinder space, said piston closely approaching said cylinder head in the upper piston dead center position, a combustion chamber in said cylinder head open in the direction of said cylinder block, said combustion chamber partially overlapping said cylinder space and partially lying outside the same, as seen in a plan view, and substantially formed as a body of revolution with a diameter considerably greater than the distance of overlap and having an axis substantially parallel with the cylinder axis, whereby the combustion chamber is formed by a cavity in said cylinder head delimited against said cylinder block by the plane of the separating joint between the cylinder head and the cylinder block, a communicating passage between said cylinder space and the part of said combustion chamber overlapping said cylinder space, a valve with a valve disk in said cylinder head substantially co-axial with said combustion chamber and inserted into said combustion chamber for installation from the side of said combustion chamber adjacent said separating joint, another valve parallel to the cylinder axis in the cylinder head outside said combustion chamber and above said cylinder space, one of said valves being an inlet valve and the other of said valves being an outlet valve, a wall piece consisting of a substantially flat plate of diameter greater than the diameter of said combustion chamber inserted into said cavity and separating said combustion chamber from said separating joint, said plate lying directly adjacent said cylinder head and being retained in its position solely by the fastening of said cylinder head to said cylinder block so as to be readily removable upon dismounting of the cylinder head from the cylinder block, and at least one throttling opening in said wall piece connecting said cylinder space with said combustion chamber.

3. The combination according to claim 2, wherein said throttle opening is operative to impart a rotary motion to the air passing over into the combustion chamber during the compression stroke.

4. The combination according to claim 2, wherein said cylinder head is provided with a ring-shaped recess in said combustion chamber adjacent said separating joint to receive the inserted flat plate.

5. The combination according to claim 2, wherein several throttling openings are provided in said flat plate forming webs between the openings, said webs being arranged helically and directed to impart a helical motion around the axis of said combustion chamber to the air displaced from the cylinder space into said combustion chamber during the compression stroke.

6. The combination according to claim 1, further comprising an injection nozzle located to provide fuel injection substantially transversely to the axis of the combustion chamber.

References Cited in the file of this patent

UNITED STATES PATENTS

| | | |
|---|---|---|
| 2,066,228 | Ricardo | Dec. 29, 1936 |
| 2,262,981 | Weber | Nov. 18, 1941 |
| 2,513,874 | Howard | July 4, 1950 |

FOREIGN PATENTS

| | | |
|---|---|---|
| 791,772 | France | Dec. 17, 1935 |
| 843,229 | France | Mar. 20, 1939 |
| 845,700 | France | May 22, 1939 |
| 50,758 | France | Dec. 24, 1940 |
| | (1st addition to 852,718) | |
| 57,368 | Denmark | Mar. 11, 1940 |